United States Patent
Zhang et al.

(10) Patent No.: US 11,313,601 B2
(45) Date of Patent: Apr. 26, 2022

(54) SYSTEM AND METHOD FOR CONTROLLING AN EXPANSION VALVE

(71) Applicant: Hangzhou Sanhua Research Institute Co., Ltd., Zhejiang (CN)

(72) Inventors: Bin Zhang, Zhejiang (CN); Jinlan Xie, Zhejiang (CN)

(73) Assignee: Hangzhou Sanhua Research Institute Co., Ltd., Zhejiang (CN)

( * ) Notice: Subject to any disclaimer, the term of this patent is extended or adjusted under 35 U.S.C. 154(b) by 163 days.

(21) Appl. No.: 16/642,881

(22) PCT Filed: Aug. 8, 2018

(86) PCT No.: PCT/CN2018/099334
§ 371 (c)(1),
(2) Date: Feb. 27, 2020

(87) PCT Pub. No.: WO2019/042100
PCT Pub. Date: Mar. 7, 2019

(65) Prior Publication Data
US 2020/0208893 A1 Jul. 2, 2020

(30) Foreign Application Priority Data
Aug. 29, 2017 (CN) .......................... 201710754411.3

(51) Int. Cl.
*F25B 49/02* (2006.01)
*F25B 41/31* (2021.01)

(52) U.S. Cl.
CPC .............. *F25B 49/02* (2013.01); *F25B 41/31* (2021.01); *F25B 2341/06* (2013.01); *F25B 2500/06* (2013.01); *F25B 2600/2513* (2013.01)

(58) Field of Classification Search
CPC .............. F25B 2341/06; F25B 2500/06; F25B 2600/2513; F25B 41/31; F25B 49/02
See application file for complete search history.

(56) References Cited

U.S. PATENT DOCUMENTS 6,305,179 B1 10/2001 Hirota
6,418,741 B1 7/2002 Nungesser et al.
(Continued)

FOREIGN PATENT DOCUMENTS

CN 101893099 A 11/2010
CN 103388694 A 11/2013
(Continued)

OTHER PUBLICATIONS

Extended European Search Report for European Application No. 18850096.1, dated Apr. 19, 2021.
(Continued)

*Primary Examiner* — Henry T Crenshaw
(74) *Attorney, Agent, or Firm* — Wolf, Greenfield & Sacks, P.C.

(57) ABSTRACT

A control method and a control system are provided. A valve closing position of a valve device can be controlled according to the current flow direction or working mode of a refrigerant. A stroke of the valve device from a fully-opened position to a fully-closed position is defined as a total valve closing stroke. When the flow direction of the refrigerant is a forward direction, the valve device is controlled to operate at a first valve closing position, and when the flow direction of the refrigerant is a reverse direction, the valve device is controlled to operate at a second valve closing position. The first valve closing position is different from the second valve closing position, such that wear caused by valve closing can be reduced.

15 Claims, 12 Drawing Sheets

(56) References Cited

U.S. PATENT DOCUMENTS

| | | |
|---|---|---|
| 2010/0252132 A1 | 10/2010 | Neff et al. |
| 2012/0174602 A1* | 7/2012 | Olivier .................. B60H 1/005 62/79 |
| 2015/0122360 A1 | 5/2015 | Zhan et al. |
| 2015/0285545 A1* | 10/2015 | Yamashita .............. F25B 13/00 62/196.1 |
| 2015/0362236 A1* | 12/2015 | Jiang ...................... F25B 41/31 137/12 |
| 2017/0002931 A1 | 1/2017 | Shu et al. |
| 2018/0195780 A1 | 6/2018 | Itou et al. |

FOREIGN PATENT DOCUMENTS

| | | |
|---|---|---|
| CN | 103511636 A | 1/2014 |
| CN | 103672131 A | 3/2014 |
| CN | 106545660 A | 3/2017 |
| CN | 106958966 A | 7/2017 |
| EP | 1 069 385 A2 | 1/2001 |
| JP | 2010-054019 A | 3/2010 |
| JP | 2014/006651 A1 | 6/2016 |
| WO | 2014/006651 A1 | 1/2014 |
| WO | 2017/022378 | 2/2017 |

OTHER PUBLICATIONS

First Office Action for Chinese Application No. 201710754411.3, dated Nov. 25, 2020.
PCT/CN2018/099334, dated Oct. 24, 2018, International Search Report and Written Opinion.
CN 201710754411.3, dated Nov. 25, 2020, First Office Action.
International Search Report and Written Opinion for International Application No. PCT/CN2018/099334, dated Oct. 24, 2018.

* cited by examiner

SYSTEM AND METHOD FOR CONTROLLING AN EXPANSION VALVE

This application is a national stage filing under 35 U.S.C. § 371 of International Patent Application Serial No. PCT/CN2018/099334, filed Aug. 8, 2018, which claims priority to Chinese Patent Application No. 201710754411.3, titled "CONTROL METHOD AND CONTROL SYSTEM", filed on Aug. 29, 2017 with the Chinese Patent Office. The contents of these applications are incorporated herein by reference in their entirety.

FIELD

The present disclosure relates to the field of refrigerating control technologies, and in particular to a control method and a control system.

BACKGROUND

In a thermal management system, in response to a system command, a valve device controls a flow rate of a working medium or controls the working medium to be passed through or cut off. In order to meet various requirements for valve closing, the valve device is operated at an over-closing mechanical limit position during a valve closing phase regardless of different conditions, resulting in abrasion of components such as a valve needle and a valve port, thus reducing a service life of the valve device. Therefore, a technical problem desired to be solved by those skilled in the art is how to close the valve device while reducing the abrasion and meeting the requirements for valve closing.

SUMMARY

A control method and a control system are provided according to the present disclosure, to reduce abrasion of components such as a valve needle and a valve port due to an over-closing operation while meeting the requirements for valve closing.

A method for controlling a valve device to operate at a valve closing position is provided, which includes: determining a first valve closing position as the valve closing position in a case that a direction of a system pressure applied on a valve needle of the valve device is identical to a valve closing direction; and determining a second valve closing position as the valve closing position in a case that the direction of the system pressure applied on the valve needle of the valve device is different from the valve closing direction. The valve closing position includes at least the first valve closing position and the second valve closing position. The first valve closing position is different from the second valve closing position, and the first valve closing position is set farther from the fully-closing position than the second valve closing position. A total valve closing stroke is a stroke of the valve device from a fully-opening position to a fully-closing position.

In an embodiment, the method further includes: acquiring a current flow direction of a working medium or a pressure difference across a system inlet-outlet; determining, based on the current flow direction of the working medium or the pressure difference across the system inlet-outlet, whether the direction of the system pressure applied on the valve needle of the valve device is identical to the valve closing direction, to determine the first valve closing position or the second valve closing position as the valve closing position of the valve device; and controlling the valve device to operate at the first valve closing position or the second valve closing position.

In an embodiment, the control method is applied to a refrigerating system, and a valve device in the refrigerating system is controlled to operate at a valve closing position. A total valve closing stroke is a stroke of the valve device from a fully-opening position to a fully-closing position. The refrigerating system has at least has two operation modes. The valve closing position includes at least the first valve closing position and the second valve closing position. The first valve closing position is different from the second valve closing position. A working medium of the refrigerating system flows through the valve device in different directions in the two different operation modes. The method further includes: acquiring an operation mode of the refrigerating system; determining, based on the operation mode, whether the direction of the system pressure applied on the valve needle of the valve device is identical to the valve closing direction, to determine the valve closing position of the valve device; and controlling the valve device to operate at the valve closing position.

A system for controlling a valve device to operate at a valve closing position, the system is provided, which includes a calculation module, a reception module and an execution module. The calculation module is configured to determine a first valve closing position or a second valve closing position as the valve closing position based on whether a direction of a system pressure applied on a valve needle of the valve device is identical to a valve closing direction, where the first valve closing position is set farther from the fully-closing position than the second valve closing position. The reception module is configured to receive the first valve closing position or second valve closing position. The execution module is configured to control the valve device to operate at the first valve closing position or the second valve closing position that is determined by the calculation module. A total valve closing stroke is a stroke of the valve device from a fully-opening position to a fully-closing position.

In an embodiment, the calculation module is further configured to determine the first valve closing position or the second valve closing position as the valve closing position based on a current flow direction of a working medium, or a pressure difference across a system inlet-outlet or a current operation mode.

With the control method and the control system according to the technical solutions of the present disclosure, the first valve closing position or the second valve closing position may be determined as the valve closing position based on whether the direction of the system pressure applied on the valve needle of the valve device is identical to the valve closing direction. Specifically, the valve device is controlled to operate at a corresponding valve closing position based on the current flow direction of the working medium, the pressure difference across the system inlet-outlet or an operation mode of the refrigerating system. Based on different flow directions of the working medium, different pressure differences across the system inlet-outlet or different operation modes of the refrigerating system, different valve closing positions are determined. Since the working medium of the refrigerating system has different flow directions in different operation modes, and the working medium having different flow directions causes different systems pressures, and different systems pressures correspond to different valve closing positions, with this control method and control system, an internal leakage value of the valve device in valve closing operation meets a requirement, and mechanical abrasion of the components such as the valve needle and the valve port caused in each valve closing operation can be reduced, thereby prolonging a service life of the valve device.

DETAILED DESCRIPTION OF EMBODIMENTS

Figure 1:
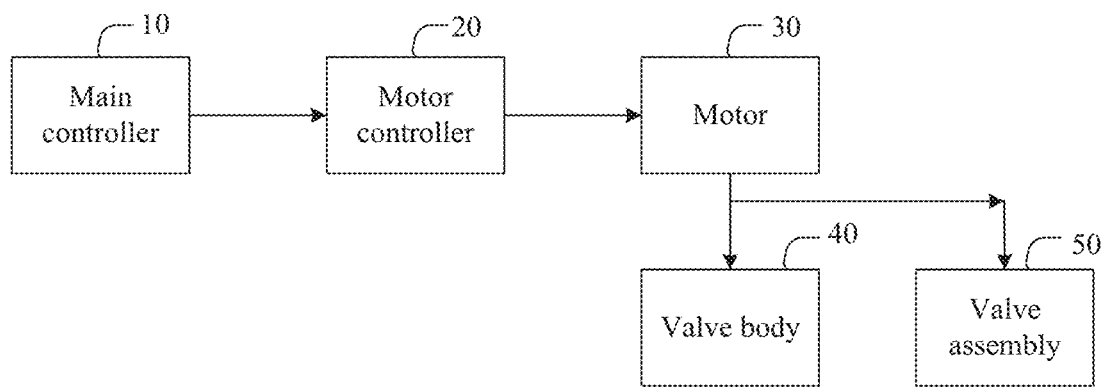
FIG. 1 is a schematic block diagram of an electronic expansion valve and a control system.

A control method and a control system are provided according to the embodiments of the present disclosure, to control an operation of a valve device. The valve device may be an electronic expansion valve, a refrigerant valve or a stop valve including a step motor, which is not enumerated herein. The electronic expansion valve, the refrigerant valve and the stop valve including a step motor may be applied to an in-vehicle air conditioning system. The valve device is described hereinafter by taking the electronic expansion valve applicable to the in-vehicle air conditioning system as an example. Since description is made by taking the electronic expansion valve as an example in the embodiments, a working medium is a refrigerant. Reference is made to FIG. 1, which is a schematic block diagram of an electronic expansion valve and a control system. The control system includes a main controller 10 and a motor controller 20. An electronic expansion valve 1 includes a motor 30, a valve body 40 and a valve assembly 50. The main controller 10 sends a control signal to the motor controller 20. The motor controller 20 sends a pulse signal to the motor 30 based on the control signal sent by the main controller 10, to drive the motor 30 to operate. The motor 30 operates to drive the valve assembly 50 connected to the motor 30 to move relative to the valve body 40, so as to adjust a position at which the electronic expansion valve 1 is opened or a position at which the electronic expansion valve 1 is closed. The control method and control system according to the embodiments of the present disclosure are applied to the motor controller 20, to control the motor 30 to operate, so as to reduce energy consumption in operation of the motor 30, thereby reducing energy consumption of the system. Alternatively, the main controller 10 may directly control the motor 30 to operate, thus the motor controller 20 is omitted.

Figure 2:
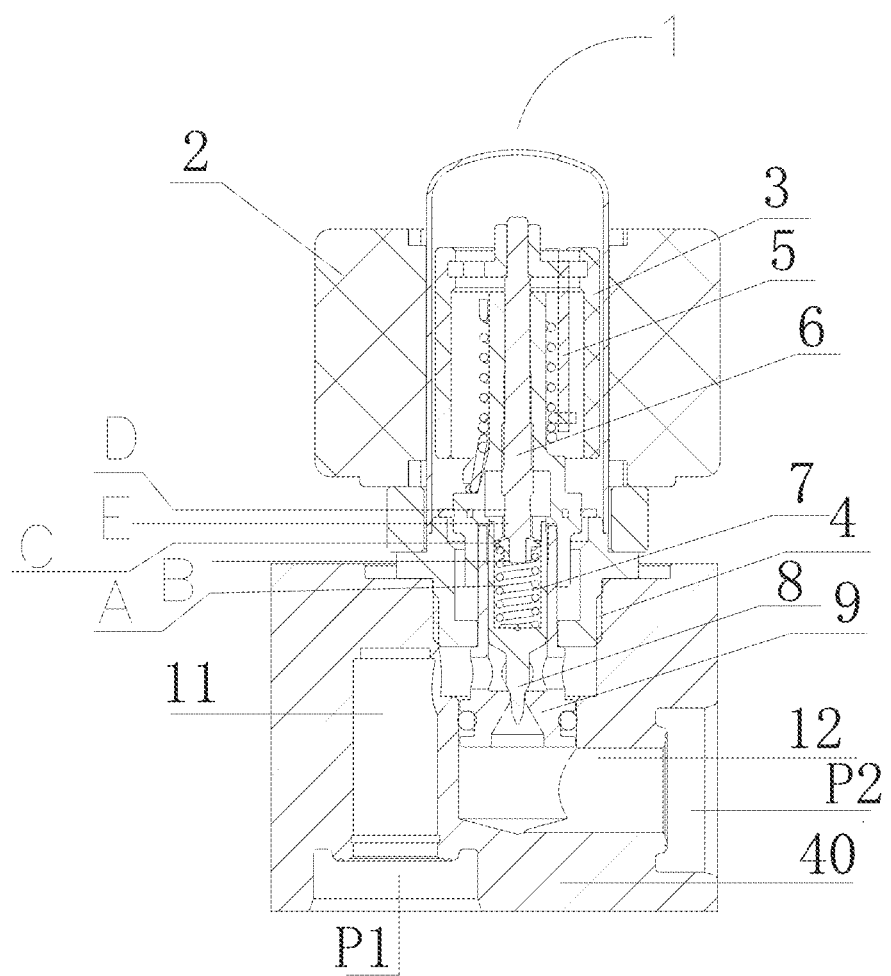
FIG. 2 is a schematic structural diagram of the electronic expansion valve shown in FIG. 1 that is marked with positions.

A stroke of the electronic expansion valve 1 from a fully-opening position to a fully-closing position is defined as a total valve closing stroke. The fully-opening position refers to a position at which an opening degree of the electronic expansion valve 1 is 100%. The fully-closing position refers to a fully-closing mechanical limit position of the electronic expansion valve 1, that is, a position at which the opening degree of the electronic expansion valve 1 is 0%. The total valve closing stroke of the electronic expansion valve 1 and positions in the total valve closing stroke are described with reference to FIGS. 2 and 3. The total valve closing stroke is the stroke of the electronic expansion valve 1 from the fully-opening position to the fully-closing position. FIG. 2 is a schematic structural diagram of the electronic expansion valve shown in FIG. 1 marked with positions. The electronic expansion valve 1 includes the motor 30, the valve body 40 and the valve assembly 50. The motor 30 includes a coil 2 and a rotor 3. The valve assembly 50 includes a transmission element 6, a stop element 5, a buffer spring 7 and a valve needle 8. The electronic expansion valve 1 is provided with a valve port 9. In this embodiment, the valve port 9 is formed at a valve seat 4. The valve seat 4 is fixedly connected to the valve body 40. A magnetic field may be excited when the coil 2 is powered on, to drive the rotor 3 to rotate. The transmission element 6 converts the rotation of the rotor 3 into up-and-down motion of the valve needle 8. The stop element 5 rotates together with the rotor 3, and is used to limit upper and lower positions of the rotor 3. The buffer spring 7 is arranged between the transmission element 6 and the valve needle 8. The valve needle 8 engages with the valve port 9, to seal the refrigerant or adjust a flow rate of the refrigerant. The electronic expansion valve 1 further includes a first passage 11 and a second passage 12. The first passage 11 is in communication with a refrigerant inlet P1. The second passage 12 is in communication with a refrigerant outlet P2.

Figure 3:
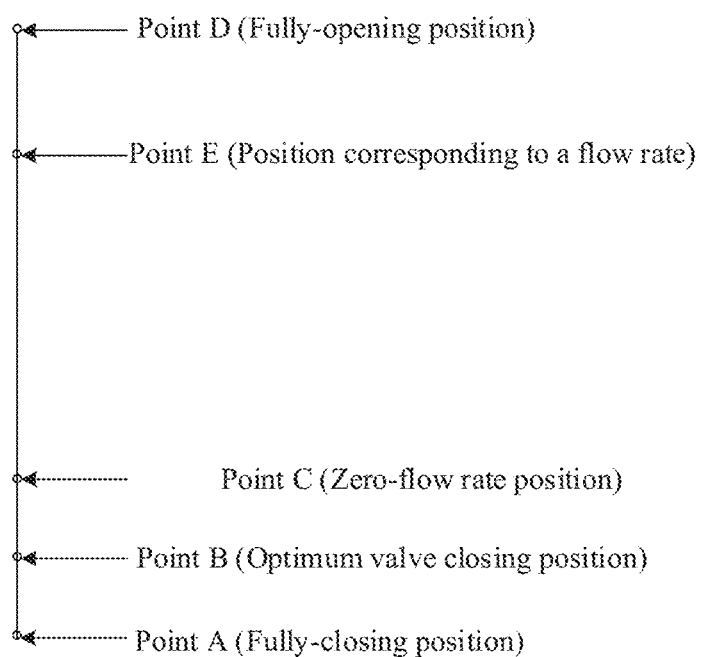
FIG. 3 is a schematic diagram showing the positions shown in FIG. 2 in a total valve closing stroke.

FIG. 3 is a schematic diagram showing the positions shown in FIG. 2 in a total valve closing stroke. A point D denotes the fully-opening position. A point A denotes the fully-closing position. A flow rate of the electronic expansion valve 1 is maximum at the point D. A point E denotes a target position of the electronic expansion valve 1, and a position of the point E may be adjusted based on a target flow rate command sent by the main controller 10, to achieve different target flow rates. The target position E is located between the fully-opening position D and the fully-closing position A. A point C denotes a zero-flow rate point. When the electronic expansion valve 1 is operated at the point C, a flow passage is just turned on or a theoretical value of the flow rate is equal to zero. A point B denotes a first valve closing position of the electronic expansion valve 1. The first valve closing position B is located between the fully-closing position A and the zero-flow point C, and is close to and is not identical to the fully-closing position A. In a case that a current flow direction of the refrigerant is forward, that is, in a case that the refrigerant flows into the electronic expansion valve 1 via the refrigerant inlet P1 and flows out of the electronic expansion valve 1 via the refrigerant outlet P2, a pressure of the refrigerant in the first passage 11 communicated with the refrigerant inlet P1 is greater than that of the refrigerant in the second passage 12 communicated with the refrigerant outlet P2, that is, a pressure difference across a system inlet-outlet is positive, a valve closing force is applied to the valve needle 8, the electronic expansion valve 1 to controlled to operate at the first valve closing position B. In this embodiment, a stroke from the first valve closing position B to the fully-opening position D is of 90% to 99% of the total valve closing stroke. In a case that the electronic expansion valve 1 operates at the first valve closing position B, the requirement for valve closing is met, and a friction subjected by components such as the valve needle 8 and the valve port 9 is small. In a case that the current flow direction of the refrigerant is backward, that is, in a case that the refrigerant flows into the electronic expansion valve 1 via the refrigerant outlet P2 and flows out of the electronic expansion valve 1 via the refrigerant inlet P1, the pressure of the refrigerant in the first passage 11 communicated with the refrigerant inlet P1 is less than the pressure of the refrigerant in the second passage 12 communicated with the refrigerant outlet P2, that is, the pressure difference across the system inlet-outlet is negative, a valve-opening force is applied to the valve needle 8, the electronic expansion valve 1 is controlled to operate at the second valve closing position A. The second valve closing position A is identical to the fully-closing position, such that sealing can be ensured. The second valve closing position A is a position at which the electronic expansion valve 1 is operated after being initialized, the second valve closing position A is also a fully-closing mechanical limit position of the electronic expansion valve 1. In a case that the electronic expansion valve 1 operates at the second valve closing position A, the requirement for valve closing is met.

The first valve closing position B is determined mainly depending on an elasticity coefficient of the buffer spring 7 of the electronic expansion valve 1. A small elasticity coefficient of the buffer spring 7 corresponds to a small range of an allowable stroke from the first valve closing position B to the fully-opening position D. The stroke from the first valve closing position B to the fully-opening position D varies depending on the electronic expansion valve. For example, in a case that the elasticity coefficient of the buffer spring 7 is equal to 10 N/mm, the range of the stroke from the first valve closing position B to the fully-opening position D is of 90% to 99% of the total valve closing stroke. In a case that the elasticity coefficient of the buffer spring 7 is equal to 7 N/mm, the range of the stroke from the first valve closing position B to the fully-opening position D is of 92% to 99% of the total valve closing stroke. In a case that the elasticity coefficient of the buffer spring 7 is equal to 5 N/mm, the range of the stroke from the first valve closing position B to the fully-opening position D is of 95% to 99% of the valve closing total stroke. In a case that the elasticity coefficient of the buffer spring 7 is equal to 3 N/mm, the range of the stroke from the first valve closing position B to the fully-opening position D is of 96% to 99% of the total valve closing stroke. In this embodiment, the control method is described with only one of the above cases, and the buffer spring 7 with other elasticity coefficients may also be used to control the valve closing position, which is not enumerated herein.

Figure 4:
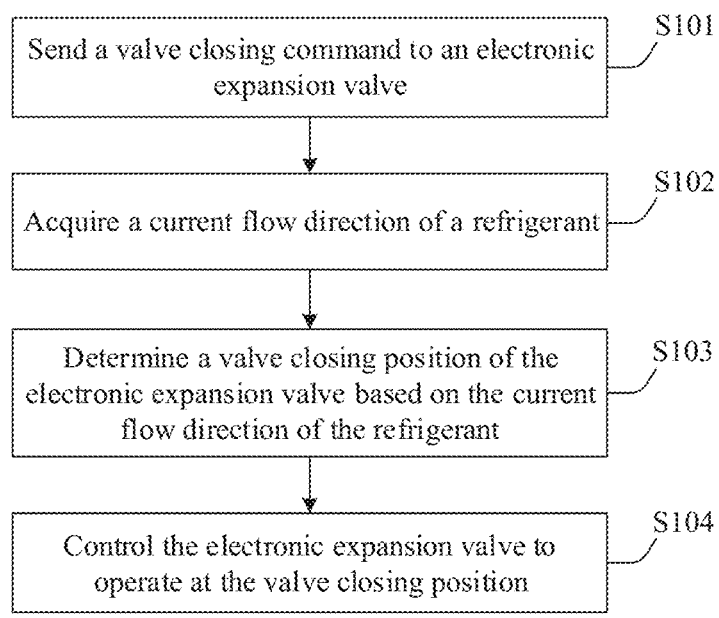
FIG. 4 is a schematic flowchart of a method for controlling an electronic expansion valve to be closed according to an embodiment.

An embodiment of a method for controlling an electronic expansion valve to be closed is described. Reference is made to FIG. 4, which is a schematic flowchart of a method for controlling the electronic expansion valve to be closed according to an embodiment. The electronic expansion valve 1 includes a control unit and an operation unit. The control unit includes the motor controller 20. The operation unit includes the valve body 40 and the valve assembly 50. The control unit receives a control signal sent by the main controller, and controls the operation unit to execute a corresponding control command.

The method for controlling the electronic expansion valve 1 to be closed according to this embodiment includes the following steps S101 to S104.

In step S101, a valve closing command is sent to the electronic expansion valve 1. Specifically, the valve closing command is sent to the control unit of the electronic expansion valve.

It is required to initiate the electronic expansion valve 1 when the electronic expansion valve 1 is started for the first time, such that the electronic expansion valve 1 can operate normally. In this way, operating accuracy of the electronic expansion valve 1 can be ensured.

It is to be noted that the electronic expansion valve 1 is initiated only when the electronic expansion valve 1 is started for the first time or in a case that faults are cleared. In this case, the electronic expansion valve 1 is forced to operate at the second valve closing position A. Further, if the motor controller 20 is integrated with the main controller 10, step S101 may be omitted, and the main controller 10 directly controls the valve device to operate.

In step S102, a current flow direction of the refrigerant or a pressure difference across the system inlet-outlet is acquired.

It is to be understood that, in a case that an in-vehicle air conditioner operates, the flow direction of the refrigerant may change with time. The flow direction of the refrigerant or the pressure difference across the system inlet-outlet may directly affects a direction of a pressure applied by the refrigerant on the electronic expansion valve 1, so as to affect the valve closing position of the electronic expansion valve 1.

In a case that the flow direction of the refrigerant is forward, that is, a pressure at the refrigerant inlet P1 is greater than a pressure at the refrigerant outlet P2 and the pressure difference across the system inlet-outlet is positive, the direction of the pressure applied by the refrigerant on the electronic expansion valve 1 is identical to a valve closing direction of the electronic expansion valve 1, and the pressure of the refrigerant facilitates valve closing operation of the electronic expansion valve 1. In a case that the flow direction of the refrigerant is backward, that is, the pressure at the refrigerant inlet P1 is less than the pressure at the refrigerant outlet P2 and the pressure difference across the system inlet-outlet is negative, the direction of the pressure applied by the refrigerant on the electronic expansion valve 1 is opposite to the valve closing direction of the electronic expansion valve 1, and the pressure of the refrigerant hinders the valve closing operation of the electronic expansion valve 1.

In step S103, the first valve closing position or the second valve closing position is determined as the valve closing position of the electronic expansion valve based on the current flow direction of the refrigerant or the pressure difference across the system inlet-outlet.

In this embodiment, the valve closing direction of the electronic expansion valve 1 is mainly determined based on the flow direction of the refrigerant. Once the electronic expansion valve is formed, an elasticity coefficient of the buffer spring 7 is also determined, thus the first valve closing position B and the second valve closing position A are also determined. Therefore, in actual conditions, the valve closing direction of the same electronic expansion valve 1 is mainly determined based on the flow direction of the refrigerant. The valve closing position of the electronic expansion valve 1 varies depending on the flow direction of the refrigerant. In a case that the current flow direction of the refrigerant is forward, the pressure at the refrigerant inlet P1 is greater than the pressure at the refrigerant outlet P2, and the pressure difference across the system inlet-outlet is positive, the pressure of the refrigerant facilitates the valve closing operation of the electronic expansion valve 1. In this case, the first valve closing position B is determined as the valve closing position of the electronic expansion valve 1, that is, the stroke from the first valve closing position B to the fully-opening position D is of 90% to 99% of the total valve closing stroke. In a case that the current flow direction of the refrigerant is backward, the pressure at the refrigerant inlet P1 is less than the pressure at the refrigerant outlet P2, and the pressure difference across the system inlet-outlet port is negative, the pressure of the refrigerant hinders the valve closing operation of the electronic expansion valve 1. In this case, the second valve closing position A, that is, the fully-closing position A is determined as the valve closing position of the electronic expansion valve 1, to meet the requirement for valve closing. The valve closing position is determined in real time based on an actual flow direction of the refrigerant, so that the requirement for valve closing can be met for each valve closing process, thereby reducing abrasion of components such as the valve needle and the valve port due to over-closing, thus prolonging a service life of the electronic expansion valve and improving the accuracy in controlling the electronic expansion valve.

In step S104, the electronic expansion valve 1 is controlled to operate at the first valve closing position or the second valve closing position that is determined in step S103.

In a case that the electronic expansion valve 1 operates normally, since the electronic expansion valve 1 operates at a target position E in the total valve closing stroke at which an actual target flow rate is achieved, the valve closing operation of the electronic expansion valve 1 is started at the target position E. In a case that the electronic expansion valve 1 receives a valve closing command and the flow direction of the refrigerant is forward, the motor controller 20 controls the electronic expansion valve 1 to operate at the first valve closing position B, to complete the valve closing operation. In a case that the electronic expansion valve 1 receives a valve closing command and the flow direction of the refrigerant is backward, the motor controller 20 controls the electronic expansion valve 1 to operate at the second valve closing position A, to complete the valve closing operation. In a case that the valve closing operation is completed and no new valve-opening command is received, the main controller 10 detects the flow direction of the refrigerant or the pressure difference across the system inlet-outlet. In a case that the flow direction of the refrigerant remains unchanged or the pressure difference across the system inlet-outlet remains unchanged, the electronic expansion valve 1 remains at a current valve closing position. In a case that the flow direction of the refrigerant is changed from forward to backward or the pressure difference across the system inlet-outlet is changed from positive to negative, the electronic expansion valve 1 is controlled to operate from the first valve closing position B to the second valve closing position A. In a case that the flow direction of the refrigerant is changed from backward to forward or the pressure difference across the system inlet-outlet is changed from negative to positive, the electronic expansion valve 1 is controlled to operate from the second valve closing position A to the first valve closing position B.

Figure 5:
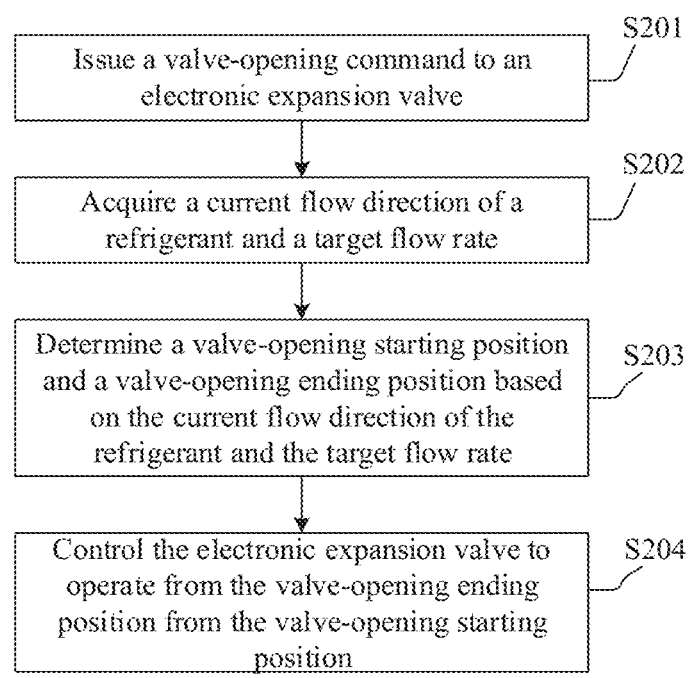
FIG. 5 is a schematic flowchart of a method for controlling an electronic expansion valve to be opened according to the embodiment.

An embodiment of a method for controlling an electronic expansion valve to be opened is described below. Reference is made to FIG. 5, which is a schematic flowchart of a method for controlling an electronic expansion valve to be opened according to an embodiment.

The method for controlling the electronic expansion valve 1 to be opened according to the embodiment includes the following steps S201 to S204.

In step S201, a valve-opening command is sent to the electronic expansion valve 1. Specifically, the valve-opening command is sent to the control unit of the electronic expansion valve.

It is to be understood that valve-opening operation of the electronic expansion valve 1 described herein does not denotes an initial valve-opening operation, but a valve-opening operation performed after the above described valve closing operation is completed. In a case that the motor controller 20 is integrated with the main controller 10, step S201 may be omitted, and the main controller 10 directly controls the valve device to operate.

In step S202, a current flow direction of the refrigerant or a pressure difference across the system inlet-outlet, and a target flow rate are acquired.

It is to be noted that, in a case that an in-vehicle air conditioning system operates, when the valve closing operation is completed, the valve closing position of the electronic expansion valve 1 may be directly acquired based on the current flow direction of the refrigerant or the pressure difference across the system inlet-outlet, where the valve closing position is also a valve-opening starting position of the electronic expansion valve 1. A target position E corresponding to a target flow rate is determined based on a target flow rate command sent by the main controller 10, where the target position E is also a valve-opening ending position of the electronic expansion valve 1.

In S203, a valve-opening starting position and a valve-opening ending position of the electronic expansion valve 1 are acquired based on the current flow direction of the refrigerant and the target flow rate or based on the pressure difference across the system inlet-outlet and the target flow rate.

In a case that the current flow direction of the refrigerant is forward or the pressure difference across the system inlet-outlet is positive, the first valve closing position B is determined as the valve-opening starting position of the electronic expansion valve 1. In a case that the current flow direction of the refrigerant is backward or the pressure difference across the system inlet-outlet is negative, the second valve closing position A is determined as the valve-opening starting position of the electronic expansion valve 1. The target position E corresponding to an actual target flow rate is acquired based on the target flow rate, where the target position E is determined as the valve-opening ending position In step S204, the electronic expansion valve 1 is controlled to operate from the valve-opening starting position to the valve-opening ending position. It may be appreciated that, the control unit controls the electronic expansion valve to operate from the valve-opening starting position to the valve-opening ending position.

In a case that the valve-opening starting position and the valve-opening ending position of the electronic expansion valve 1 are determined, the main controller 10 sends a control command to the motor controller 20, to control the motor 30 to drive the valve assembly 50 to operate, to perform the valve-opening operation.

Figure 6:
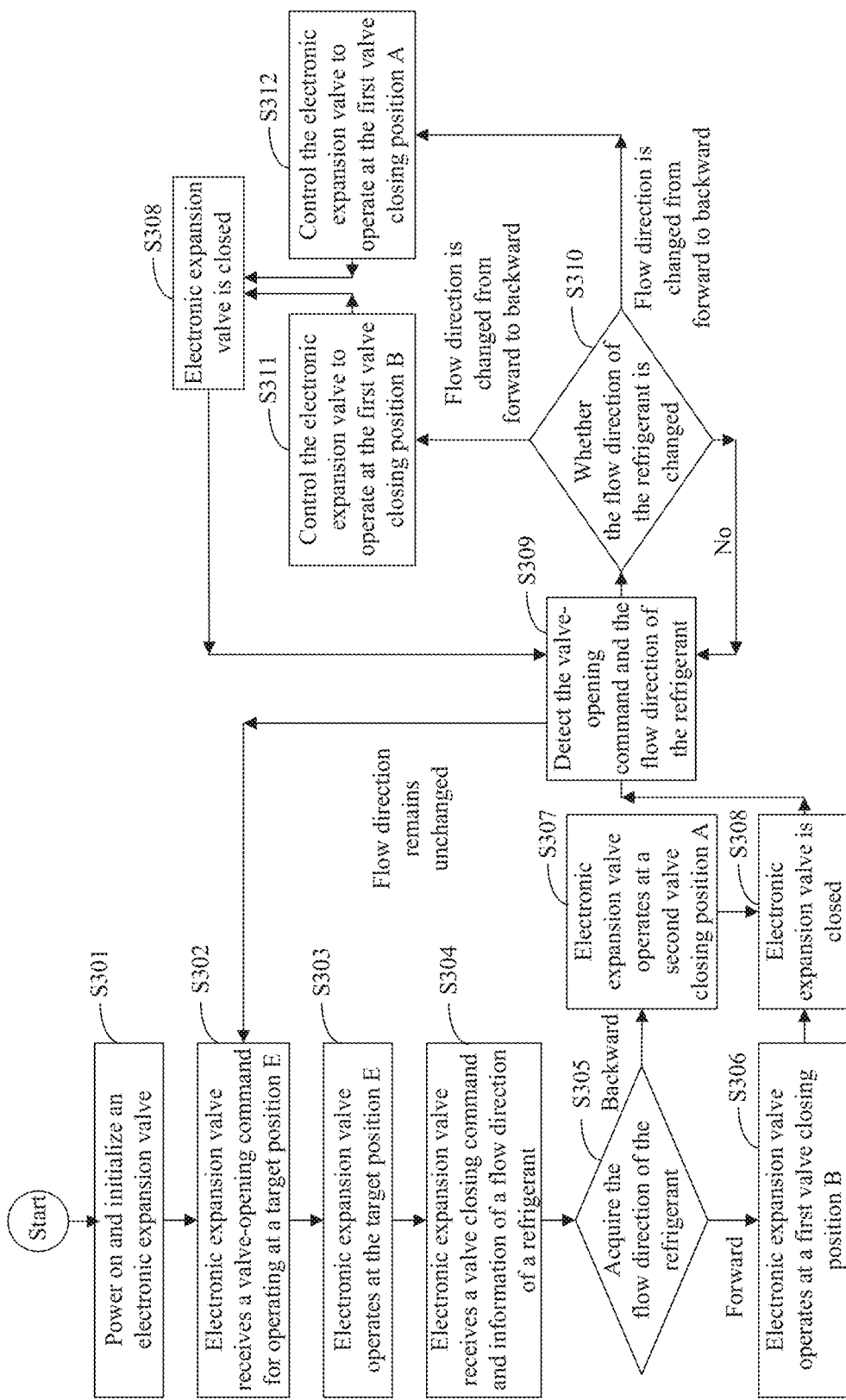
FIG. 6 is a schematic flowchart of a method for controlling an electronic expansion valve according to another embodiment.

Another embodiment of the method for controlling an electronic expansion valve is further described below. Reference is made to FIG. 6, which is a schematic flowchart of a method for controlling the electronic expansion valve according to another embodiment.

Firstly, the vehicle air conditioning system is started.

In step S301, the electronic expansion valve 1 is powered on and is initialized.

The electronic expansion valve 1 is initialized generally only when the electronic expansion valve 1 is started for the first time or when faults are cleared. The electronic expansion valve 1 is powered on and is initialized, such that the accuracy of the electronic expansion valve 1 in controlling the flow rate can be ensured. In this case, the electronic expansion valve is controlled to operate at the fully-closing position A.

In step S302, the electronic expansion valve 1 receives a valve-opening command for operating at the target position E. The main controller 10 sends the valve-opening command and a target flow rate to the electronic expansion valve 1, and sends a corresponding valve-opening starting position and a corresponding valve-opening ending position to the electronic expansion valve 1, where the fully-closing position A is determined as the valve-opening starting position, and the target position E at which the target flow rate is achieved is determined as the valve-opening ending position.

It is to be noted that the target position E is located between the fully-opening position D and the fully-closing position A and varies in response to the target flow rate command. The target position E may remain unchanged or may be changed for each valve-opening operation, which is determined according to actual needs.

In step S303, the electronic expansion valve 1 operates at the target position E.

The electronic expansion valve 1 is controlled to operate from the fully-closing position A to the target position E, and the air conditioning system operates steadily.

In step S304, the electronic expansion valve 1 receives a valve closing command and information of the flow direction of the refrigerant.

In a case that the air conditioner operates for a period of time, the main controller 10 sends the valve closing command and the information of a current flow direction of the refrigerant to the electronic expansion valve 1.

In step S305, the current flow direction of the refrigerant is acquired.

The main controller 10 acquires the current flow direction of the refrigerant, and determines the valve closing position of the electronic expansion valve 1 based on the current flow direction of the refrigerant. In a case that the current flow direction of the refrigerant is forward, the first valve closing position B is determined as the valve closing position of the electronic expansion valve 1. In a case that the current flow direction of the refrigerant is backward, the second valve closing position A is determined as the valve closing position of the electronic expansion valve 1.

In step S306, in a case that the current flow direction of the refrigerant is forward, the electronic expansion valve 1 operates at the first valve closing position B.

In a case that the current flow direction of the refrigerant is forward, the first valve closing position B is determined as the valve closing position of the electronic expansion valve 1. The stroke from the first valve closing position B to the fully-opening position D is of 90% to 99% of the total valve closing stroke. The electronic expansion valve 1 is controlled to operate at the first valve closing position B.

In step S307, in a case that the current flow direction of the refrigerant is backward, the electronic expansion valve 1 operates at the second valve closing position A.

In a case that the current flow direction of the refrigerant is backward, the second valve closing position A is determined as the valve closing position of the electronic expansion valve 1. The valve closing position A is identical to the fully-closing position in the total valve closing stroke. The electronic expansion valve 1 is controlled to operate at the second valve closing position A.

In step S308, the electronic expansion valve 1 is closed.

The electronic expansion valve 1 operates at a corresponding valve closing position, and the valve closing operation is completed.

In step S309, a valve-opening command and the flow direction of the refrigerant are detected.

In a case that the valve closing operation is completed, the motor controller 20 receives the valve-opening command and the information of the flow direction of the refrigerant that are sent by the main controller 10, and controls the electronic expansion valve to be opened. In a case that the main controller 10 detects that the flow direction of the refrigerant remains unchanged in the whole time period before receiving a new valve-opening command, the method returns to step S302 when a new valve-opening command is received, to repeat the valve-opening operation and the valve closing operation successively. In a case that the main controller 10 detects that the flow direction of the refrigerant has changed before receiving a new valve-opening command, the method proceeds to step S310.

In step S310, it is detected that the flow direction of the refrigerant is changed.

The main controller 10 detects that the flow direction of the refrigerant is changed and sends a current flow direction of the refrigerant to the motor controller 20, to control the electronic expansion valve 1 to adjust the valve closing position.

In step S311, in a case that the flow direction of the refrigerant is changed from backward to forward, the electronic expansion valve 1 is controlled to operate at the first valve closing position B.

In a case that the main controller 10 detects that the flow direction of the refrigerant is changed from backward to forward, the motor controller 20 controls the electronic expansion valve 1 to adjust the valve closing position from the second valve closing position A to the first valve closing position B.

In step S312, in a case that the flow direction of the refrigerant is changed from forward to backward, the electronic expansion valve 1 is controlled to operate at the second valve closing position A.

In a case that the main controller 10 detects that the flow direction of the refrigerant is changed from forward to backward, the motor controller 20 controls the electronic expansion valve 1 to adjust the valve closing position from the first valve closing position B to the second valve closing position A.

In step 308, the electronic expansion valve 1 is closed.

The valve closing position is determined in real time based on the flow direction of the refrigerant, to perform the valve closing operation. Then, the valve-opening command and the flow direction of the refrigerant are detected continually, to repeat the above steps to perform the valve-opening operation and the valve closing operation of the electronic expansion valve 1.

Further, the valve closing position may be determined based on an operation mode of a refrigerating system.

Figure 7:
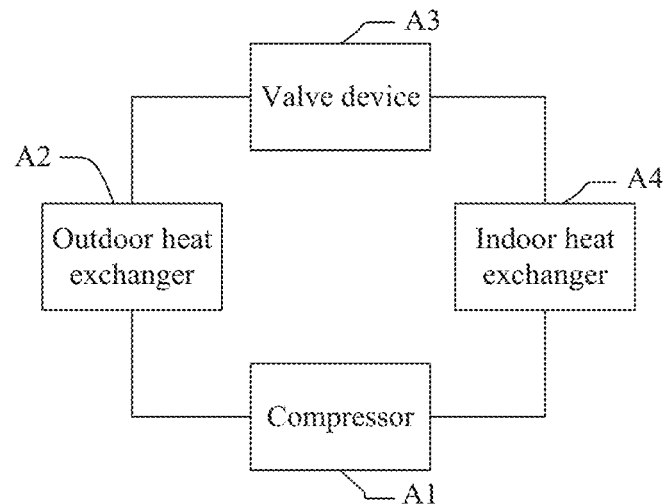
FIG. 7 is a schematic block diagram of a refrigerating system.

Reference is made to FIG. 7, which is a schematic block diagram of a refrigerating system. A refrigerating system of an air conditioner is taken as an example. The refrigerating system of an air conditioner may include four parts, namely, a compressor A1, an outdoor heat exchanger A2, a valve device A3, and an indoor heat exchanger A4, where the valve device A3 is an electronic expansion valve.

Figure 8:
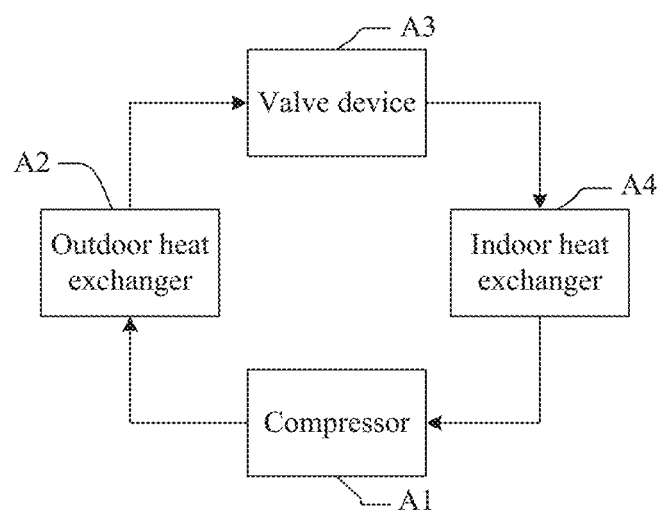
FIG. 8 is a schematic diagram showing a flow path of a refrigerant in a refrigerating mode according to a first embodiment.

Reference is made to FIG. 8, which is a schematic diagram showing a flow path of a refrigerant in a refrigerating mode according to a first embodiment. In the refrigerating mode, a gas refrigerant with a low temperature and a low pressure is compressed into a gas with a high temperature and a high pressure by the compressor A1, and then flows into the outdoor heat exchanger A2, where the outdoor heat exchanger A2 serves as a condenser. In the outdoor heat exchanger A2, the gas refrigerant is condensed and liquefied into a liquid refrigerant while releasing heat. The liquid refrigerant is decompressed by the valve device A3, and flows into the indoor heat exchanger A4, where the indoor heat exchanger A4 serves as an evaporator. In the indoor heat exchanger A4, the liquid refrigerant is evaporated and gasified into a gas refrigerant with a low temperature and a low pressure while absorbing heat, and then flows into the compressor A1, for a next cycle. In this process, the indoor heat exchanger A4 absorbs heat from the indoor and the outdoor heat exchanger A2 releases the heat to the outside, such that indoor temperature is lowered. In this case, the refrigerant flows from the outdoor heat exchanger A2 to the valve device A3, and a flow direction of the refrigerant in this case is determined as being forward. Therefore, in the refrigerating mode, in a case of receiving a valve closing command, the refrigerating system controls the valve device to operate at the first valve closing position. A stroke of the valve device A3 from a fully-opening position to a fully-closing position is referred to as a total valve closing stroke, and a stroke from the first valve closing position to the fully-opening position is of 90% to 99% of the total valve closing stroke.

Figure 9:
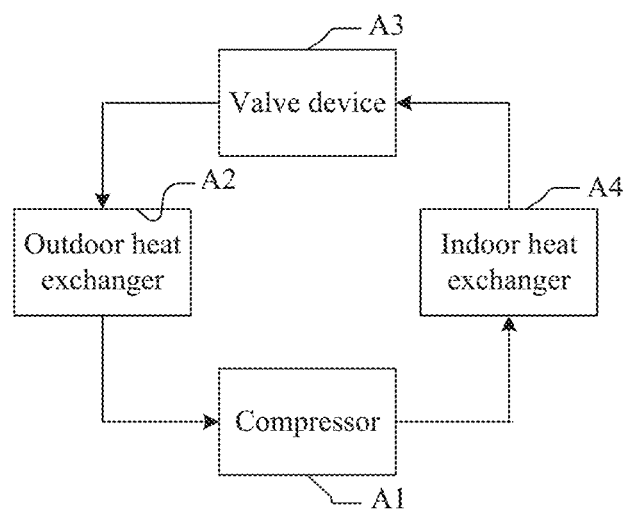
FIG. 9 is a schematic diagram showing a flow path of a refrigerant in a heating mode according to the first embodiment.

Reference is made to FIG. 9, which is a schematic diagram showing a flow path of the refrigerant in a heating mode according to the first embodiment. In the heating mode, the gas refrigerant with a low temperature and a low pressure is compressed into a gas with a high temperature and a high pressure by the compressor A1, and then flows into the indoor heat exchanger A4, where the indoor heat exchanger A4 serves as a condenser. In the indoor heat exchanger A4, the gas refrigerant is condensed and liquefied into a liquid refrigerant while releasing heat. The liquid refrigerant is decompressed by the valve device A3, and flows into the outdoor heat exchanger A2, where the outdoor heat exchanger A2 serves as an evaporator. In the outdoor heat exchanger A2, the liquid refrigerant is evaporated and gasified into a gas refrigerant with a low temperature and a low pressure while absorbing heat, and flows into the compressor A1, for a next cycle. In this process, the outdoor heat exchanger A2 absorbs heat from the outside and the indoor heat exchanger A4 releases the heat to the indoor, such that indoor temperature is increased. In this case, the refrigerant flows from the valve device A3 to the outdoor heat exchanger A2, and a flow direction of the refrigerant in the heating mode is backward. Therefore, in the heating mode, in a case of receiving a valve closing command, the refrigerating system controls the valve device to operate at the second valve closing position, where the second valve closing position is identical to the fully-closing position in the total valve closing stroke.

In this embodiment, the flow direction of the refrigerant in the refrigerating mode is different from that in the heating mode, and the valve closing position in the refrigerating mode is also different from that in the heating mode. An inlet and an outlet for the refrigerant may be respectively arranged with a pressure sensor, to determine the corresponding valve closing position based on the pressure difference across a system inlet-outlet. In a case that the flow direction of the refrigerant is forward, the pressure difference across the system inlet-outlet is positive. In a case that the flow direction of the refrigerant is backward, the pressure difference across the system inlet-outlet is negative. In actual conditions, the refrigerating system may also have other operation modes besides the refrigerating mode and the heating mode. A second embodiment of the present disclosure is described below with reference to the drawings.

Figure 10:
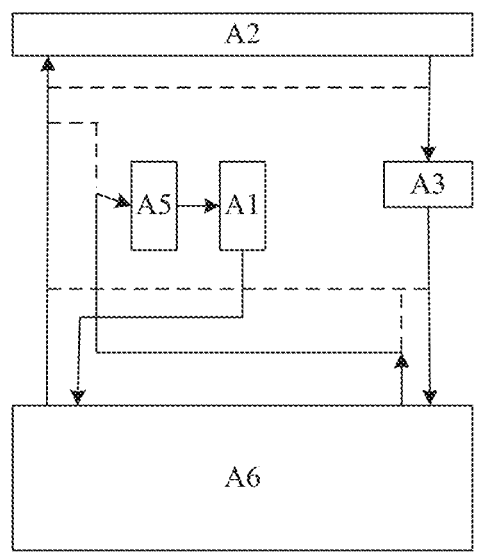
FIG. 10 is a schematic diagram showing a flow path of a refrigerant in the refrigerating mode according to a second embodiment.

Reference is made to FIG. 10, which is a schematic diagram showing a flow path of the refrigerant in the refrigerating mode according to the second embodiment, where a solid line denotes the flow path of the refrigerant, and a direction of an arrow denotes a flow direction of the refrigerant. In the refrigerating mode, the refrigerant flows into an air handling unit A6 from the compressor A1, and then flows into the outdoor heat exchanger A2 via the air handling unit A6 for heat exchanging. Then the refrigerant flows into the air handling unit A6 via the valve device A3, where the air handling unit A6 serves as an evaporator in this case. Finally, the refrigerant flows out from the air handling unit A6 and returns to the compressor A1 via a gas-liquid separator A5. In this way, an operating cycle is completed. The flow direction of the refrigerant from the outdoor heat exchanger A2 to the valve device A3 is determined as being forward, in the refrigerating mode, in a case of receiving the valve closing command, the refrigerating system controls the valve device A3 to operate at the first valve closing position.

Figure 11:
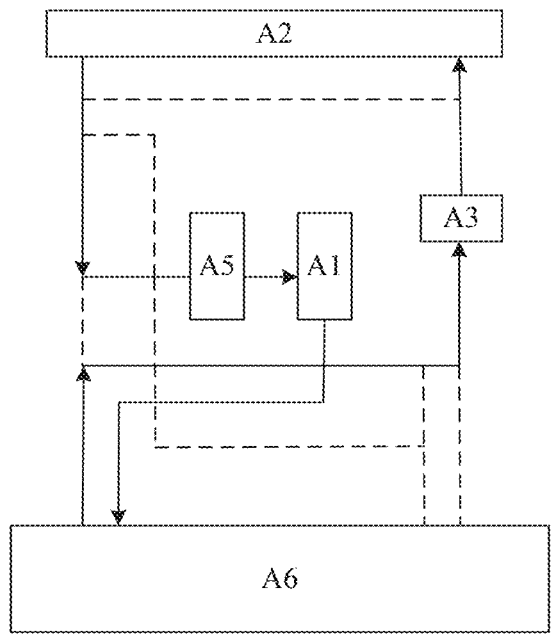
FIG. 11 is a schematic diagram showing a flow path of a refrigerant in the heating mode according to the second embodiment.

Reference is made to FIG. 11, which is a schematic diagram showing a flow path of the refrigerant in the heating mode according to the second embodiment, where a solid line denotes the flow path of the refrigerant, and a direction of an arrow denotes a flow direction of the refrigerant. In the heating mode, the refrigerant flows into the air handling unit A6 from the compressor A1, in which a heat exchange process including both an evaporation process and a condensation process is performed. Then, the refrigerant directly passes though the valve device A3 and flow back to the compressor via the gas-liquid separator A5, thus an operating cycle is completed. In the heating mode, since the refrigerant flows in a direction from the valve device A3 to the outdoor heat exchanger A2, which is opposite to that in the refrigerating mode, the refrigerating system controls the valve device A3 to operate at the second valve closing position in a case of receiving the valve closing command.

Figure 12:
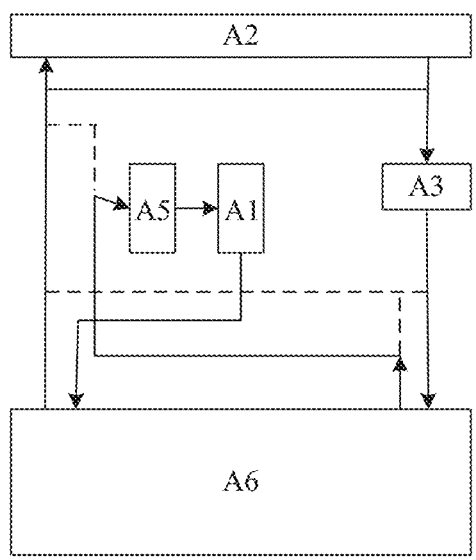
FIG. 12 is a schematic diagram showing a flow path of a refrigerant in a dehumidifying mode according to an embodiment.

Reference is made to FIG. 12, which is a schematic diagram showing a flow path of the refrigerant in a dehumidifying mode according to an embodiment, where a solid line denotes the flow path of the refrigerant, and a direction of an arrow denotes a flow direction of the refrigerant. In the dehumidifying mode, a flow direction of the refrigerant is similar to that in the refrigerating mode with an only difference in that the refrigerant may flow into the gas-liquid separator A5 via the outdoor heat exchanger A2 or directly flow into the gas-liquid separator A5 after passing through the valve device A3, to complete an operating cycle. In the dehumidifying mode, the refrigerant also flows from the valve device A3 to the outdoor heat exchanger A2, such that a valve closing position in the dehumidifying mode is identical to that in the refrigerating mode. In a case of receiving a valve closing command, the refrigerating system controls the valve device A3 to operate at the first valve closing position.

In actual conditions, the flow direction of the refrigerant in the refrigerating mode is identical to that in the dehumidifying mode. When designing the refrigerating system, the flow direction of the refrigerant in the refrigerating mode may be designed as a backward flow direction in which the refrigerant flows from the indoor heat exchanger A4 to the valve device A3. In this way, the flow direction of the refrigerant in the refrigerating mode is backward, the flow direction of the refrigerant in the heating mode is forward, and the flow direction of the refrigerant in the dehumidifying mode is backward. In a case that the flow direction of the refrigerant is forward, the first valve closing position is determined as the valve closing position of the valve device. In a case that the flow direction of the refrigerant is backward, the second valve closing position is determined as the valve closing position of the valve device.

The refrigerating system may further have other operation modes, and each of the refrigerating mode, the heating mode and the dehumidifying mode may include modes of different levels, such as a first refrigerating mode, a second refrigerating mode, a first heating mode, a second heating mode, a simple dehumidifying mode as well as a cooling and dehumidifying mode, which are not enumerated herein. Flow directions of the refrigerant in different operation modes are determined depending on a design of the refrigerating system. Once the refrigerating system is formed, a flow direction of the refrigerant in each operation mode is determined. That is, for the same refrigerating system, one operation mode corresponds to only one flow direction of the refrigerant, and one flow direction of the refrigerant corresponds to only one valve closing position. In a case that the operation mode is determined, the flow direction of the refrigerant is determined, and the valve closing position is also determined. The valve closing position may be determined based on a current operation mode of the refrigerating system, and the valve device may be controlled to be opened or closed, or to adjust the valve closing position according to the current operation mode.

Figure 13:
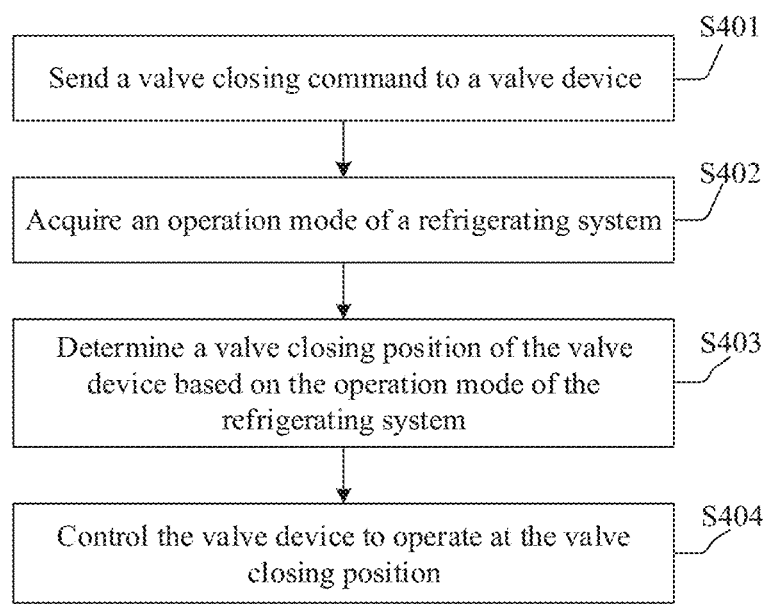
FIG. 13 is a schematic flowchart of a method for controlling a valve device in a refrigerating system to be closed according to an embodiment.

Reference is made to FIG. 13, which is a schematic flowchart of a method for controlling a valve device in the refrigerating system to be closed according to an embodiment. Generally, in different operation modes of the refrigerating system, the flow directions of the refrigerant are different, pressure differences across the system inlet-outlet are different, and circulating directions of the refrigerating system during operation are different. The refrigerating system mainly has operation modes such as a refrigerating mode, a heating mode, and a dehumidifying mode. Once the refrigerating system is formed, one operation mode corresponds to one flow direction of the refrigerant and one valve closing position.

In step S401, a valve closing command is sent to the valve device.

The main controller 10 sends the valve closing command to the valve device, to control the electronic expansion valve to be started. In this control method, the motor controller may be omitted, and the main controller directly controls the valve device to operate, thus step S401 may be omitted.

In step S402, an operation mode of the refrigerating system is acquired.

The main controller 10 detects the operation mode of the refrigerating system in real time, to acquire a current operation mode of the refrigerating system. In different operation modes, the flow directions of the refrigerant are different, the pressure differences across the system inlet-outlet are different, and valve closing positions are different.

In step S403, a valve closing position of the valve device is determined based on the operation mode of the refrigerating system.

The main controller 10 determines the valve closing position corresponding to current operation mode of the refrigerating system based on the operation mode of the refrigerating system.

In step S404, the valve device is controlled to operate at the valve closing position.

The valve device of the refrigerating system is controlled to operate at the valve closing position corresponding to the operation mode of the refrigerating system, such that the valve closing operation is completed.

The control method for the refrigerating system is similar to that for the electronic expansion valve with an only difference in that the operation mode of the refrigerating system rather than the flow direction of the refrigerant is acquired to determine the valve closing position. Steps of the control method for the refrigerating system are similar to that described in the above, which are not repeated herein.

Based on the control method according to the above embodiments, a control system is further provided according to the present disclosure.

Figure 14:
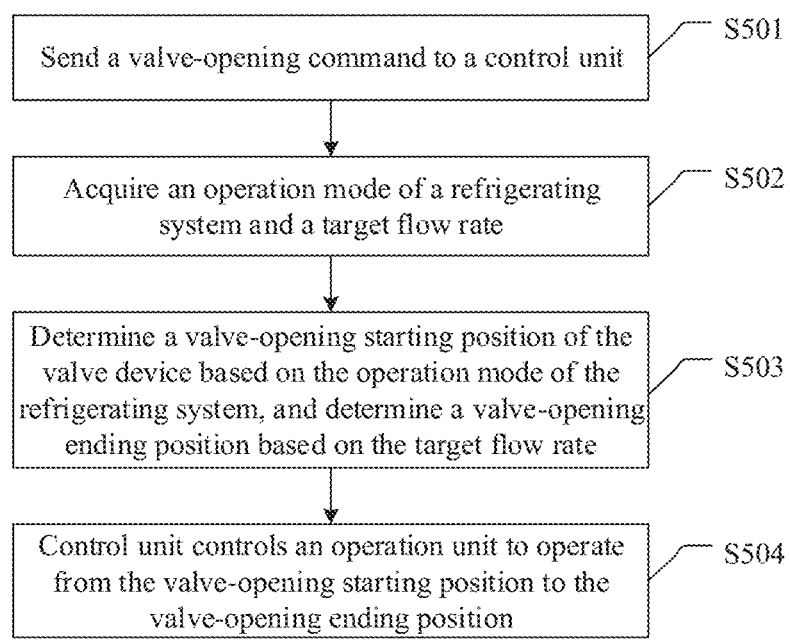
FIG. 14 is a schematic flowchart of a method for controlling a valve device in a refrigerating system to be opened according to an embodiment.

Reference is made to FIG. 14, which is a schematic flowchart of a method for controlling the valve device in the refrigerating system to be opened according to an embodiment.

In step S501, a valve-opening command is sent to the control unit.

In a case that the refrigerating system is closed or sleeps for a period of time, the main controller 10 sends the valve-opening command to the motor controller 20, and the motor controller 20 controls the electronic expansion valve 1 to be started.

In step S502, an operation mode of the refrigerating system and a target flow rate are acquired.

The main controller 10 acquires the operation mode of the refrigerating system and a flow rate adjusting target based on a starting command. In a case that the valve-opening command is sent, a current operation mode of the refrigerating system is firstly determined. In different operation modes, the flow directions of the refrigerant are different, the pressure differences across the system inlet-outlet are different, and valve closing positions are different.

In step S503, a valve-opening starting position of the valve device is determined based on the operation mode of the refrigerating system, and a valve-opening ending position is determined based on the target flow rate.

The main controller 10 acquires the valve-opening starting position in a target operation mode of the refrigerating system based on the operation mode of the refrigerating system, and acquires the valve-opening ending position based on the target flow rate.

In step S504, the control unit controls an operation unit to operate from the valve-opening starting position to the valve-opening ending position.

The motor controller 20 controls the valve device of the refrigerating system to operate from the valve-opening starting position to the valve-opening ending position, such that the valve-opening operation is completed.

The control method for the refrigerating system is similar to that for the electronic expansion valve with an only difference in that the operation mode of the refrigerating system rather than the flow direction of the refrigerant is determined to determine the valve closing position. Steps of the control method for the refrigerating system are similar to that described in the above, which are not repeated herein. Further, in this control method, the motor controller may be omitted, and the main controller directly controls the valve device to operate, thus step S401 may be omitted.

Figure 15:
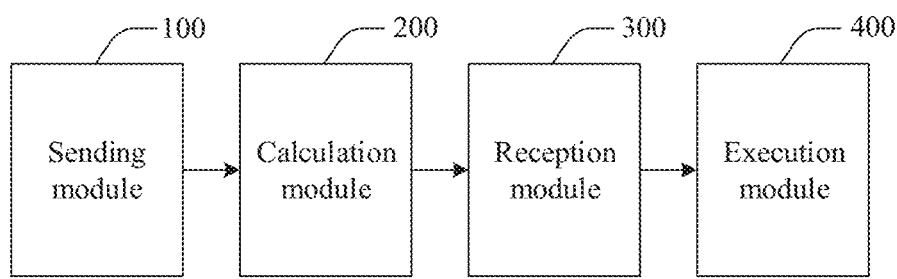
FIG. 15 is a schematic block diagram of a system for controlling an electronic expansion valve according to an embodiment.

Reference is made to FIG. 15, which is a schematic block diagram of a system for controlling an electronic expansion valve according to an embodiment.

The system for controlling an electronic expansion valve according to this embodiment includes a sending module 100, a calculation module 200, a reception module 300 and an execution module 400.

The sending module 100 is configured to send a control signal. The control signal includes a valve closing command and/or a valve-opening command.

The calculation module 200 is configured to determine information such as a valve closing position, a valve-opening starting position or a valve-opening ending position based on a current flow direction of the refrigerant, or a pressure difference across the system inlet-outlet, or an operation mode of the refrigerating system and a target flow rate.

The reception module 300 is configured to receive the information such as the valve closing position, the valve-opening starting position and the valve-opening ending position.

The execution module 400 is configured to execute a control command, to control the electronic expansion valve 1 to operate at a corresponding position. With the system according to this embodiment, in a case that the sending module 100 sends the control signal to the electronic expansion valve 1, the calculation module 200 determines the information such as the valve closing position, the valve-opening starting position or the valve-opening ending position. The reception module 300 receives the corresponding control command and the information such as the control command, the valve closing position, the valve-opening starting position and the valve-opening ending position. The execution module 400 controls, based on the information received by the reception module 300, the electronic expansion valve 1 to operate at the valve closing position, the valve-opening starting position or the valve-opening ending position.

In the method and the system according to the embodiments, in a case that the air conditioning system operates, a stroke of the electronic expansion valve from the fully-opening position D to the fully-closing position A is referred to as a valve closing total stroke. When a valve closing command is received, a current flow direction of the refrigerant is determined. In a case that the flow direction of the refrigerant is forward, the first valve closing position B is determined as the valve closing position of the electronic expansion valve, and a stroke from the first valve closing position B to the fully-opening position D is of 90% to 99% of the total valve closing stroke. In a case that the flow direction of the refrigerant is backward, the second valve closing position A is determined as the valve closing position of the electronic expansion valve, where the second valve closing position A is the fully-closing position in the total valve closing stroke. In this way, the electronic expansion valve is controlled to operate at a corresponding valve closing position each time, such that the requirement for valve closing is met and abrasion of components such as the valve needle and the valve port is reduced in maximum when closing the electronic expansion valve, thereby improving flow rate control accuracy and operating efficiency of the electronic expansion valve and prolonging a service life of the electronic expansion valve.

In the embodiments, multiple parameters are used to determine whether the valve closing position is the first valve closing position or the second valve closing position. Specifically, it is determined whether a direction of a system pressure applied on the valve needle of the valve device is identical to the valve closing direction. In a case that the direction of the system pressure applied on the valve needle of the valve device is identical to the valve closing direction, under the action of the system pressure, it is unnecessary to determine the valve closing position of the valve needle to be too close to the fully-closing position, and the first valve closing position is determined as the valve closing position. In a case that the direction of the system pressure applied on the valve needle of the valve device is different from the valve closing direction, the system pressure serves as a reacting force on the valve needle, and the second valve closing position is determined as the valve closing position to avoid adverse effect on the valve closing operation due to the system pressure. That is, the force for valve closing is enhanced to ensure valve closing effect. In the above, it is determined whether the direction of the system pressure applied on the valve needle of the valve device is identical to the valve closing direction based on parameters such as the flow direction of the refrigerant in the system, the pressure difference in the system and the operation mode of the system, however, other parameters which can reflect whether the direction of the system pressure applied on the valve needle of the valve device is identical to the valve closing direction may also be used.

The above described embodiments are only preferred embodiments of the present disclosure and are not meant to limit the present disclosure. The preferred embodiments of the present disclosure are disclosed above, which should not be interpreted as limiting the present disclosure. Numerous alternations, modifications, and equivalents can be made to the technical solutions of the present disclosure by those skilled in the art in light of the methods and technical content disclosed herein without deviation from the scope of the present disclosure. Therefore, any alternations, modifications, and equivalents made to the embodiments above according to the technical essential of the present disclosure without deviation from the scope of the present disclosure should fall within the scope of protection of the present disclosure.

The invention claimed is:

1. A method for controlling a valve device to operate at a valve closing position, comprising:
   determining a first valve closing position as the valve closing position in a case that a direction of a system pressure applied on a valve needle of the valve device is identical to a valve closing direction; and determining a second valve closing position as the valve closing position in a case that the direction of the system pressure applied on the valve needle of the valve device is different from the valve closing direction, wherein the valve closing position comprises at least the first valve closing position and the second valve closing position, the first valve closing position is different from the second valve closing position, and the first valve closing position is set farther from a fully-closing position than the second valve closing position, and a total valve closing stroke is a stroke of the valve device from a fully-opening position to the fully-closing position.

2. The method according to claim 1, further comprising:
acquiring a current flow direction of a working medium or a pressure difference across a system inlet-outlet;
determining, based on the current flow direction of the working medium or the pressure difference across the system inlet-outlet, whether the direction of the system pressure applied on the valve needle of the valve device is identical to the valve closing direction, to determine the first valve closing position or the second valve closing position as the valve closing position of the valve device; and
controlling the valve device to operate at the first valve closing position or the second valve closing position.

3. The method according to claim 1, wherein in a case that a current flow direction of a working medium is forward or a pressure difference across a system inlet-outlet is positive, the direction of the system pressure applied on the valve needle of the valve device is identical to the valve closing direction, and the method further comprises: controlling the valve device to operate at the first valve closing position, wherein the valve device is an electronic expansion valve and a stroke from the first valve closing position to the fully-opening position is of 90% to 99% of the total valve closing stroke.

4. The method according to claim 3, wherein in a case that the current flow direction of the working medium is backward or the pressure difference across the system inlet-outlet is negative, the method further comprises:
controlling the valve device to operate at the second valve closing position, wherein the second valve closing position is identical to the fully-closing position.

5. The method according to claim 4, further comprising:
acquiring a target flow rate;
determining a valve-opening starting position and a valve-opening ending position of the valve device based on the current flow direction of the working medium and the target flow rate, or determining the valve-opening starting position and the valve-opening ending position of the valve device based on the pressure difference across the system inlet-outlet and the target flow rate; and
controlling the valve device to operate from the valve-opening starting position to the valve-opening ending position, wherein
the fully-opening position of the valve device is a position at which a flow rate of the valve device is maximum, the fully-closing position of the valve device is a fully-closing mechanically-limiting position of the valve device, a target position corresponding to the target flow rate is a position at which the flow rate reaches the target flow rate.

6. The method according to claim 5, wherein
in a case that the current flow direction of the working medium is forward or the pressure difference across the system inlet-outlet is positive, the valve-opening starting position is identical to the first valve closing position; and
in a case that the current flow direction of the working medium is backward or the pressure difference across the system inlet-outlet is negative, the valve-opening starting position is identical to the second valve closing position, and wherein
the valve-opening ending position is identical to the target position corresponding to the target flow rate.

7. The method according to claim 1, wherein the valve device is an electronic expansion valve, and the electronic expansion valve comprises:
a motor comprising a coil and a rotor;
a valve body; and
a valve assembly comprising a transmission element, a buffer spring and the valve needle, and wherein
the electronic expansion valve is provided with a valve port, rotation of the rotor is converted into up-and-down motion of the valve needle via the transmission element, and
the buffer spring is arranged between the transmission element and the valve needle, and a large elasticity coefficient of the buffer spring corresponds to a large range of an allowable stroke from the first valve closing position to the fully-opening position.

8. The method according to claim 7, wherein the electronic expansion valve further comprises: a control unit configured to control the valve needle to operate at the first valve closing position or the second valve closing position.

9. The method according to claim 1, wherein a refrigerating system has at least two different operation modes, and a working medium of the refrigerating system flows through the valve device in different directions in the two different operation modes, and wherein
the method further comprises:
acquiring an operation mode of the refrigerating system;
determining, based on the operation mode, whether the direction of the system pressure applied on the valve needle of the valve device is identical to the valve closing direction, to determine the first valve closing position or the second valve closing position as the valve closing position of the valve device; and
controlling the valve device to operate at the first valve closing position or the second valve closing position.

10. The method according to claim 9, wherein the refrigerating system has a refrigerating mode and a heating mode, and a flow direction of the working medium in the refrigerating mode is opposite to the flow direction of the working medium in the heating mode, and wherein
in a case that the flow direction of the working medium is forward in the refrigerating mode or a pressure difference across the system inlet-outlet is positive in the refrigerating mode, the first valve closing position is determined as the valve closing position in the refrigerating mode; and in a case that the flow direction of the working medium is backward in the heating mode or the pressure difference across the system inlet-outlet is negative in the heating mode, the second valve closing position is determined as the valve closing position in the heating mode;
in a case that the flow direction of the working medium is backward in the refrigerating mode or the pressure difference across the system inlet-outlet is negative in the refrigerating mode, the second valve closing position is determined as the valve closing position in the refrigerating mode; and in a case that the flow direction of the working medium is forward in the heating mode or the pressure difference across the system inlet-outlet is positive in the heating mode, the first valve closing position is determined as the valve closing position in the heating mode; and the valve device is controlled to operate at the first valve closing position or the second valve closing position based on the operation mode, wherein a stroke from the first valve closing position to the fully-opening position is of 90% to 99% of the total valve closing stroke, and the second valve closing position is identical to the fully-closing position.

11. The method according to claim 10, wherein the refrigerating system further has a dehumidifying mode, and the flow direction of the working medium of the refrigerating system in the dehumidifying mode is identical to the flow direction of the working medium of the refrigerating system in the refrigerating mode, and wherein in a case that the flow direction of the working medium is forward in the dehumidifying mode or the pressure difference across the system inlet-outlet is positive in the dehumidifying mode, the first valve closing position is determined as the valve closing position in the dehumidifying mode, and in a case that the flow direction of the working medium is backward in the dehumidifying mode or the pressure difference across the system inlet-outlet is negative in the dehumidifying mode, the second valve closing position is determined as the valve closing position in the dehumidifying mode.

12. A system for controlling a valve device to operate at a valve closing position, the system comprising a main controller configured to:

determine a first valve closing position or a second valve closing position as the valve closing position based on whether a direction of a system pressure applied on a valve needle of the valve device is identical to a valve closing direction, wherein the first valve closing position is set farther from the fully-closing position than the second valve closing position;

receive the first valve closing position or second valve closing position; and control the valve device to operate at the first valve closing position or the second valve closing position that is determined by the calculation module, wherein a total valve closing stroke is a stroke of the valve device from a fully-opening position to a fully-closing position.

13. The system according to claim 12, wherein the main controller is further configured to determine the first valve closing position or the second valve closing position as the valve closing position based on a current flow direction of a working medium, or a pressure difference across a system inlet-outlet or a current operation mode.

14. The system according to claim 13, wherein the valve closing position comprises at least the first valve closing position and the second valve closing position, and in a case that the current flow direction of the working medium is forward or the pressure difference across the system inlet-outlet is positive, the valve device is controlled to operate at the first valve closing position, wherein the valve device is an electronic expansion valve, and a stroke from the first valve closing position to the fully-opening position is of 90% to 99% of the total valve closing stroke; and in a case that the current flow direction of the working medium is backward, the valve device is controlled to operate at the second valve closing position, wherein the second valve closing position is identical to the fully-opening position in the total valve closing stroke.

15. The system according to claim 14, wherein the main controller is further configured to:

send a valve-opening command to the valve device, determine a valve-opening starting position and a valve-opening ending position based on the current flow direction of the working medium and a target flow rate;

receive information of the valve-opening starting position and the valve-opening ending position, and control the valve device to operate from the valve-opening starting position to the valve-opening ending position.

* * * * *

UNITED STATES PATENT AND TRADEMARK OFFICE
CERTIFICATE OF CORRECTION

PATENT NO. : 11,313,601 B2
APPLICATION NO. : 16/642881
DATED : April 26, 2022
INVENTOR(S) : Bin Zhang et al.

It is certified that error appears in the above-identified patent and that said Letters Patent is hereby corrected as shown below:

In the Claims

At Column 20, Lines 3-5, in Claim 12, remove wording "by the calculation module"

Signed and Sealed this
Twelfth Day of July, 2022

Katherine Kelly Vidal
*Director of the United States Patent and Trademark Office*